I. W. McGAFFEY.
Corn-Planter.
No. 35,771. Patented July 1. 1862.
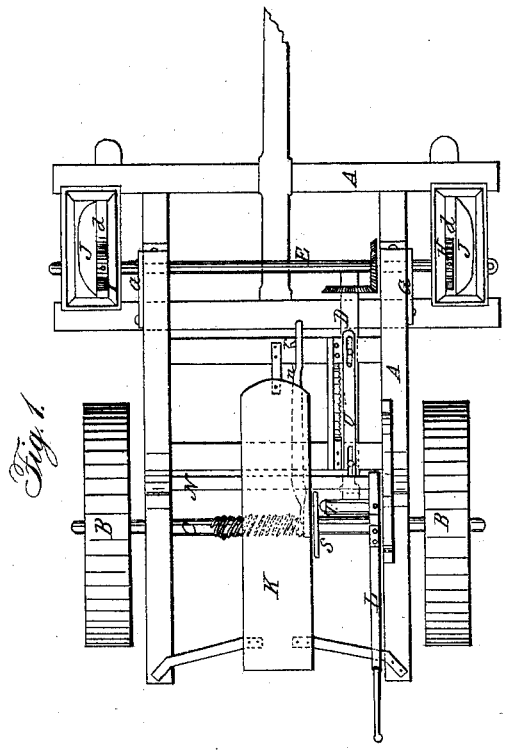
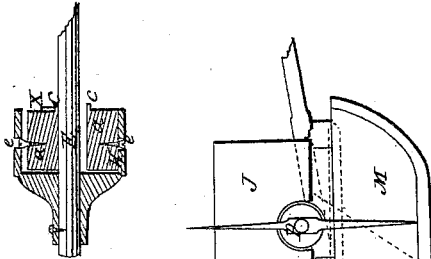
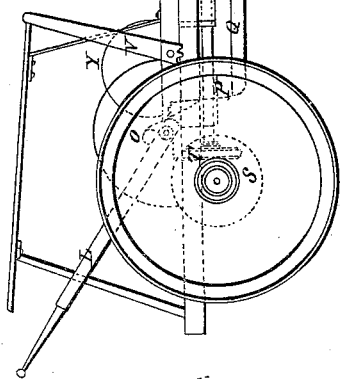
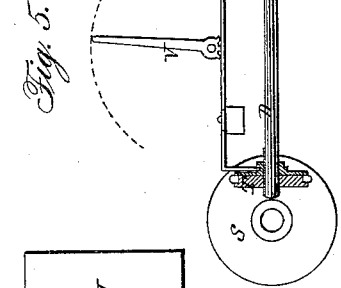
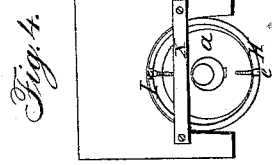
Witnesses:
Inventor:
Ives W. McGaffey

UNITED STATES PATENT OFFICE.

IVES W. McGAFFEY, OF CHICAGO, ILLINOIS.

IMPROVEMENT IN SEED-PLANTERS.

Specification forming part of Letters Patent No. 35,771, dated July 1, 1862.

*To all whom it may concern:*

Be it known that I, IVES W. MCGAFFEY, of the city of Chicago, county of Cook, and State of Illinois, have invented new and useful Improvements in Seed-Planters; and I do hereby declare that the following is a clear and exact description thereof, reference being had to the accompanying drawings and the letters of reference marked thereon, in which—

Figure 1 is a plan or top view, showing the relative position of the different parts. Fig. 2 is a side elevation. Fig. 3 is a transverse sectional view of compound seed-distributing cylinder. Fig. 4 is an end view of the same, showing its elevation to the seed-box. Fig. 5 is a sectional view of the movable friction-wheel T, showing its connection with the hand-lever. Fig. 6 is a perspective view, showing the general combination.

The machine consists of a frame, A A, made in two parts, and hinged together by collars G G, which are fast on the rear part of the frame, and work on sleeve-boxes which are fast on the front part of the frame. Through these sleeve-boxes passes a shaft, E, on which are fixed the seed-distributing cylinders H and I. Over these cylinders are fitted the seed-boxes J J. Beneath them is fixed the plow or runner M for opening a furrow and conducting the seed from the cylinder to the ground. The rear part of the frame rests on shaft C, which is fast in the driving-wheels B B, and turns with them. From this shaft motion is communicated to the front shaft, E, by the cross-shaft D, which has a common bevel-gear at the front end and at the rear end an adjustable friction-gear. Upon shaft C is a disk-wheel, S, with a plain or ribbed face standing at right angles to its axis. This disk is pressed against the periphery of a friction-wheel, T, which is composed of an elastic ring of rubber or other compound fixed between two collars properly recessed and held together by screws. To the hub of wheel T is attached a shipper, U, which is connected with lever V. This is fixed against a segment of a circle or dial, Y, upon which is a series of notches for the lever to catch into, so that it may be set to any desired point. By moving this lever V backward or forward the wheel T is moved to or from the axle of the friction-disk S, thereby changing the relative motion of the seed-distributing cylinders to the driving-wheels in a great or small degree, regardless of fixed ratios, thereby enabling the operator to control the motion of the seed-distributing cylinders, so as to drop the seed in hills any desired distance apart (by moving the lever V) without stopping the machine. This device enables the operator to keep the cylinders dropping in checks or squares by compensating for any gain or loss of the driving-wheels by going over obstructions or uneven surfaces of ground.

Figs. 3 and 4 show the compound cylinder and hub. In the periphery of this cylinder two holes are drilled opposite to each other, the rim of which is thick enough for a cavity of sufficient depth to hold the required amount of seed for a hill. Into these holes plugs *e e* are fitted loosely, the shank of which screws into the circular movable slide *a*. Upon this slide are projecting points *c c*, which come in contact with cross-bar X on the seed-boxes. As the cylinders revolve the slide *a* is forced down, so that the lower plug comes flush with the periphery of the cylinder, thereby insuring the dislodgment of any grains that might have a tendency to stick in the cavity. At the same time the plug on the upper side is depressed, forming a cavity in the cylinder for the seed to drop into. The depth of these cavities can be adjusted by turning the plugs in or out. In the bottom of the seed-boxes is a little brush, *d*, which is set in close contact to the cylinders, so as to brush off the seed in the cavities even with the surface of the cylinders, allowing them to pass under just full. K is the operator's seat, resting on the rear portion of the frame. L is a hand-lever connected by roller N, cam O, and strap P to the front part of frame by bar Q. By drawing this lever back the front part of the machine is raised, so that the plows or runners clear the ground, the end of the tongue being held at a fixed height by the team. The machine is held in this position by catching the lever L into a notch or brace, R. Upon the end of front shaft is a pointer, *p*, fast on the shaft E, so as to point down as the seed drops, thereby indicating to the operator the position of the hills.

Operation: The field to be planted is first marked out one way into equidistant spaces. The gears are then so adjusted by moving the lever V that as the machine moves along the pointer *p* shall strike the ground at intervals exactly corresponding with the distances between the spaces marked on the field. A mark or notch is then made on the scale Y at the point where the lever rests, so that it may be readily set back to the same point again when it is moved out. The machine is driven across these marks at right angles, the pointer being set so as to strike into the first and each succeeding mark as the machine passes over them, the seed being deposited at the same time on the mark. The marks or notches on scale Y are made to correspond with the change that is effected in the distance between the hills by moving the lever from one end to the other, so that when it is desired to change the distance between the hills one inch the lever V is moved back one inch, and in the same proportion from one-sixteenth of an inch to two feet. This minute adjustment is of vital importance in adjusting the machine to a given space, which is varied indefinitely by different farmers using different marking-machines in preparing their ground.

I do not claim changing the relative motion of two revolving shafts by any gears or systems of gears operating by fixed cogs; but What I do claim, and desire to secure by Letters Patent, is—

1. The combination, with a corn-planting machine, of the disk S and friction-wheel T, arranged and operating substantially in the manner and for the purpose set forth.

2. I do not claim broadly the shifting plugs; but what I do claim is the combination of the cylinder H, shifting plugs $e\ e$, and slide $a$ with projecting pins $c\ c$ and cross-bar X, constructed and operated as specified.

3. The combination of the flexible frame A A, the adjustable gear, and its connections with the compound seed-distributing cylinders H, arranged and operated substantially as shown and described, for the purposes specified.

IVES W. McGAFFEY.

Witnesses:
 F. H. BROWN,
 HOWARD STRONG.